June 5, 1962 — B. F. MONROE — 3,037,812

AIRCRAFT SEAT STRUCTURE

Filed July 30, 1958 — 3 Sheets-Sheet 1

INVENTOR.
BENJAMIN F. MONROE
BY Fulwider Mattingly Huntley
Attorneys

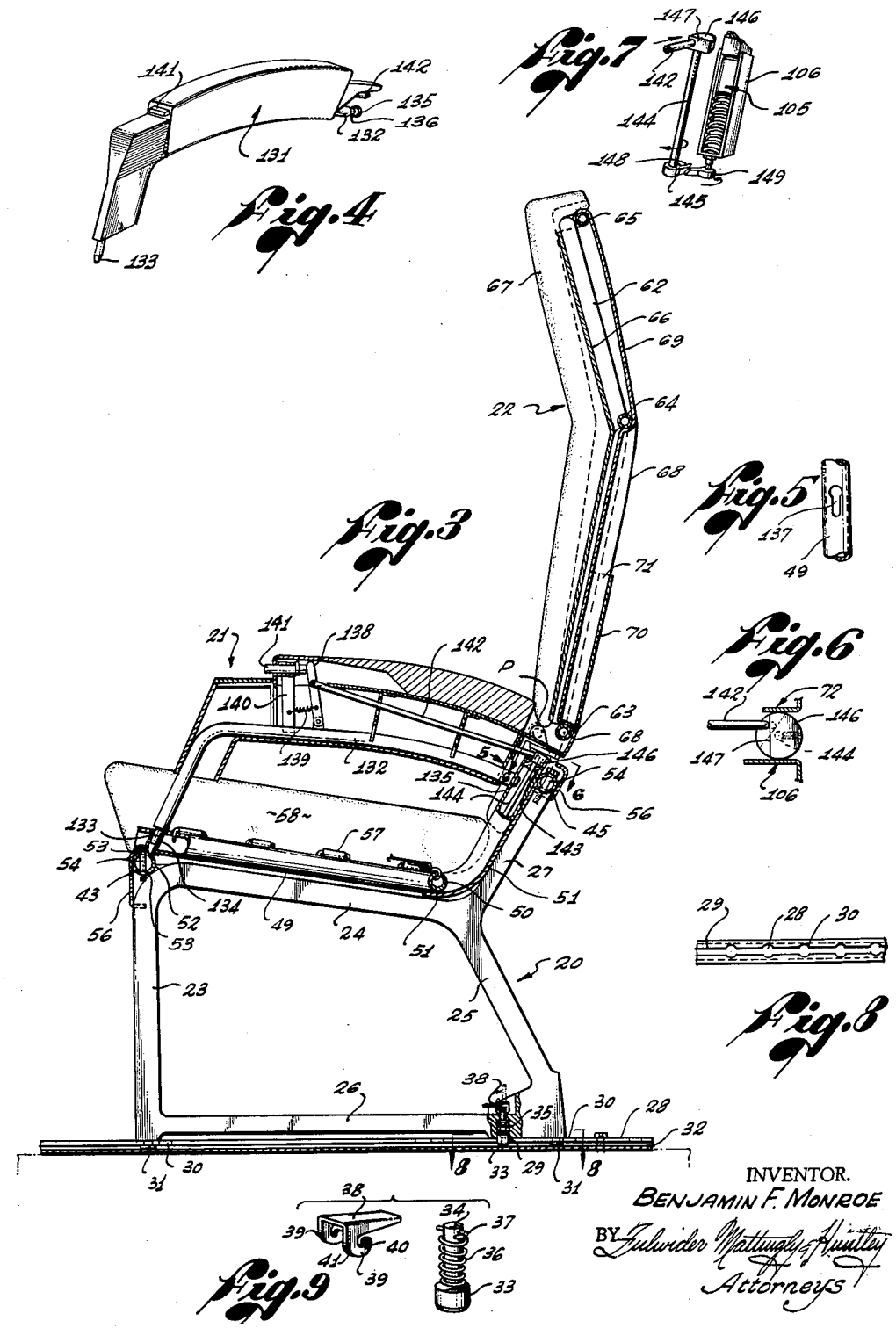

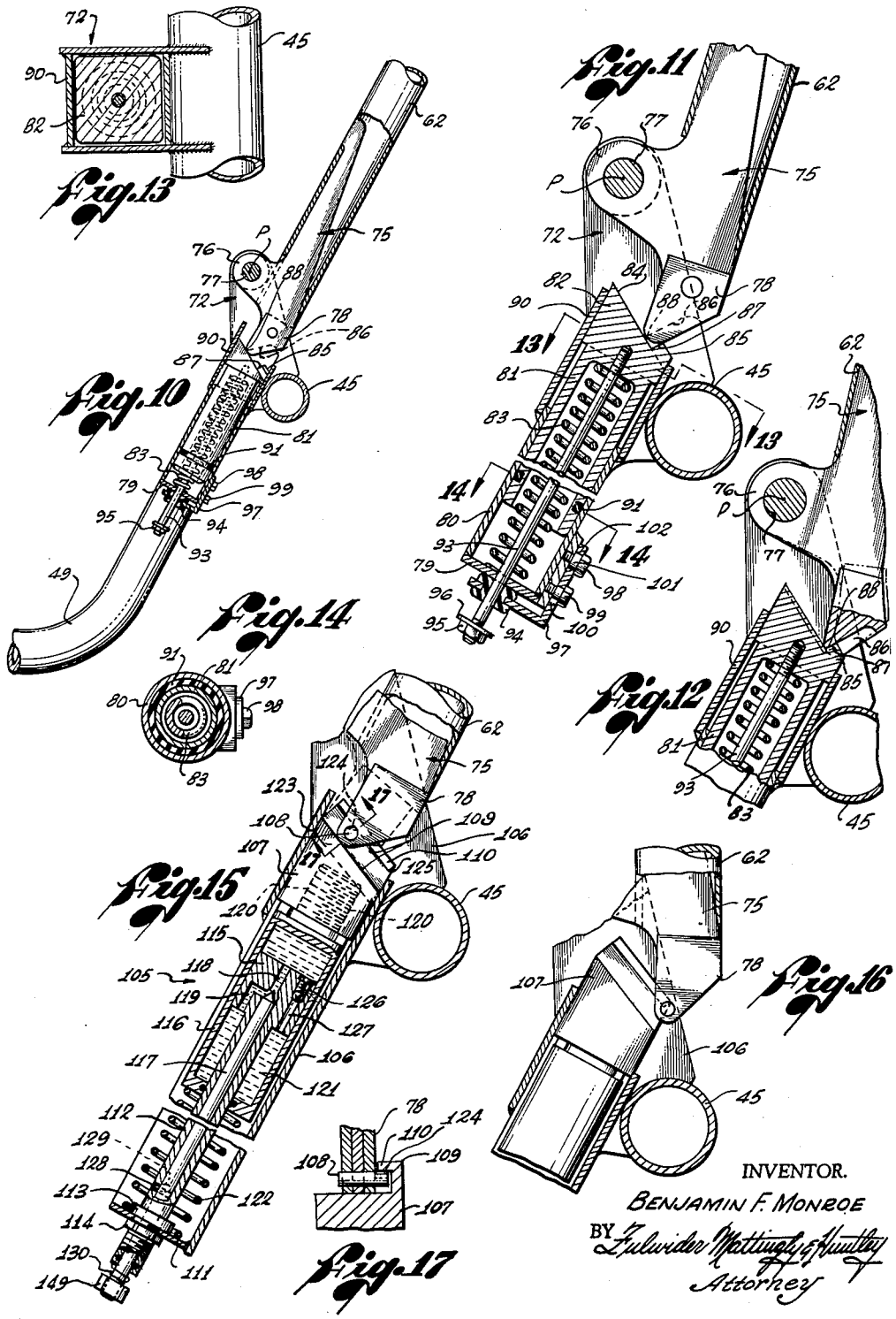

United States Patent Office 3,037,812
Patented June 5, 1962

---

3,037,812
AIRCRAFT SEAT STRUCTURE
Benjamin F. Monroe, 1734 Benedict Canyon Drive,
Beverly Hills, Calif.
Filed July 30, 1958, Ser. No. 752,115
15 Claims. (Cl. 297—355)

The present invention relates generally to passenger transportation seating and more specifically to an improved seat that permits transporting the greatest number of passengers within a given space with optimum passenger comfort.

In passenger transportation seating it is convenient to arrange seats in a plurality of ranks, one behind the other, within the given area of the particular conveyance. In order to derive the greatest possible revenue from the given area, it is desirable to install as many seats as possible, bearing in mind the requirements of passenger comfort, safety, weight of the total load and other factors. Since in most forms of conveyance such as aircraft, buses and trains, the number of seats which can be placed abreast in one rank cannot be increased, due to legal, engineering or other limits imposed on the maximum possible width of the conveyance, seating capacity can be increased only by closer spacing of the ranks of seats in a direction lengthwise of the given area.

Seat spacing is particularly critical in aircraft and in order to best demonstrate the advantages inherent in my improved seat it will be described herein as it pertains to the particular problems of aircraft. It is to be understood, however, that my invention is not limited to this particular application but is adaptable to other uses.

An object of my invention is to provide an improved passenger seat which occupies a minimum volume of space, particularly in those dimensions which limit passenger clearance and seating space between ranks of the seats. As a result the pitch between ranks of seats can be decreased without sacrificing passenger comfort whereby a given floor area can accommodate a greater number of ranks than has heretofore been possible.

Another object of my invention is to provide a seat of this type having an abbreviated back rest without a lower section, cooperatively associated with the seat cushion portion to provide comfortable lumbar support for the passenger. At the same time, the elimination of the lower part of the back rest permits utilization of the space otherwise occupied by the eliminated part as a seat cushion space for the passenger occupying the seat and as leg clearance space for the passenger behind the seat.

Yet another object of my invention is to provide a reclining seat having an articulated abbreviated back rest pivoted above the seat cushion at the lumbar level, and a headrest portion angularly related to the back rest. This location of the pivotal axis permits the back rest to assume reclined angles comfortably supporting a passenger but without intruding into the space of the passenger behind him to the same extent as would comparable inclination of a conventional seat. This arrangement not only avoids any reduction of knee space for the passenger behind the inclined back rest, but also broadens the passageway between ranks of seats to make each seat more accessible to entering passengers without unduly inconveniencing seated passengers.

A further object of my invention is to provide a reclining seat having a back rest portion adjustable to any angle of inclination within the normal range of its movement to accommodate any preference of the passenger.

It is also an object of the invention to provide a reclining seat with a non-manual control permitting automatic adjustment of the back rest to an angle of recline selected by the passenger and providing firm support of the passenger at the selected angle, the back rest also automatically returning to a normally erect position when the seat is vacant. For this purpose I have provided a novel form of control means of simple, sturdy construction adapted to give a long service life without extensive or frequent maintenance.

Another object of the invention is to provide a reclining seat having an improved manually controllable hydraulic lock for holding the back rest in adjusted position, this lock being reduced in length and width for positioning in a confined space totally within the normal outline of the seat structure so as to not intrude into passenger space.

A still further object of the invention is to provide a reclining seat having a detachable arm rest enclosing manually actuated hydraulic lock controlling means that are removably engageable with the hydraulic lock, the arm rest being removable and replaceable with ease.

These and other objects and advantages of my invention will be apparent from the following description when taken in conjunction with the annexed drawings in which:

FIGURE 3 is a vertical sectional view, on an enlarged scale, taken on a plane longitudinally intersecting a detachable arm rest of the seat and on an offset vertical plane intersecting one of the back rests of the seat;

FIGURE 4 is a perspective view of one of a detachable arm rest;

FIGURE 5 is a fragmentary elevational view, on an enlarged scale, taken in the direction of the arrow 5 of FIGURE 3, indicating the manner in which the seat frame is adapted to removably receive the rear end of the detachable arm rest;

FIGURE 6 is a partial sectional view, on an enlarged scale, taken along the line 6—6 of FIGURE 3 and showing the engagement of the manually actuated control means contained in the arm rest with the valve control means of the hydraulic lock;

FIGURE 7 is a perspective view of part of the hydraulic lock control means, on an enlarged scale;

FIGURE 8 is a partial plan view taken along the line 8—8 of FIGURE 3 showing a standard aircraft floor track adapted for mounting a seat;

FIGURE 9 is a perspective view, on an enlarged scale, of a shear pin means for use in mounting a seat on the floor track;

FIGURE 10 is a partial sectional view showing interior details of construction of my automatic seat recline control means;

FIGURE 11 is a view similar to FIGURE 10 but on an enlarged scale and showing the relationship of the parts of the control means in another attitude of the back rest of the seat;

FIGURE 12 is a view similar to FIGURE 11 showing the back rest in still another attitude relative to the seat frame;

FIGURE 13 is a sectional view taken along the line 13—13 of FIGURE 11;

FIGURE 14 is a sectional view taken along the line 14—14 of FIGURE 11;

FIGURE 15 is a partial sectional view, on an enlarged scale, showing interior details of construction of my improved hydraulic lock;

FIGURE 16 is a fragmentary sectional view similar to FIGURE 15 and showing the back rest in another attitude relative to the seat frame; and FIGURE 17 is a sectional view taken along the line 17—17 of FIGURE 15.

Figure 1:
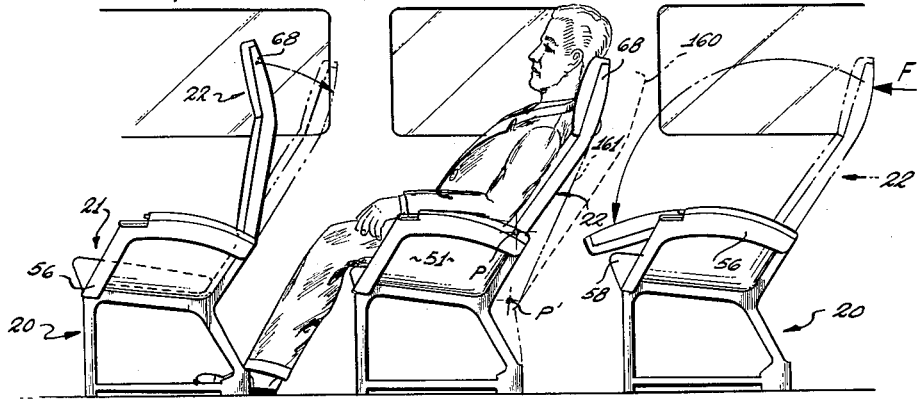
FIGURE 1 is a side elevational view of three ranks of seats embodying my invention, installed in an aircraft, each of the ranks in this instance comprising a seat with three passenger spaces.

It will be understood that my invention may be embodied in seats for one or more passengers. In the drawings, I have illustrated my invention as embodied in a three-passenger aircraft seat, in order to demonstrate how in this particular application of my invention the passenger-carrying capacity of an aircraft can be increased very greatly without sacrifice of passenger comfort or convenience.

In passenger aircraft, perhaps the most common spacing or pitch between racks of seats is 36 inches, usually found in so-called "tourist" accommodations. "First-class" accommodations may have a pitch of 38 or 40 inches while on the other hand a maximum pitch of 34 inches is prescribed by convention among the airlines for the lowest recognized level of passenger accommodation. With my invention, seats can be spaced on a 36-inch pitch and achieve the same degree of passenger comfort as has heretofore only been obtainable on a 40-inch pitch of previously available seats. Conversely, as compared to previously available seats spaced at a conventional pitch of 36 inches, for 15 to 20 ranks of such seating the present invention permits an increase of two ranks of my improved seat.

Figures 2, 2A, 2B:
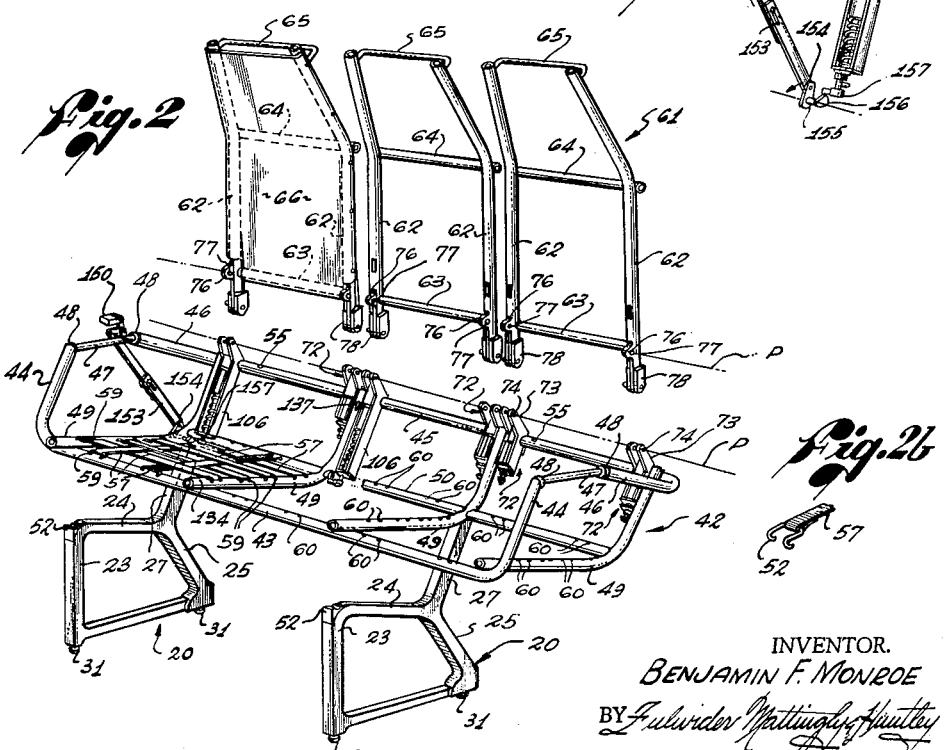
FIGURE 2 is an exploded perspective view of the framework elements of one of the seats shown in FIGURE 1.
FIGURE 2a is a detailed perspective view of a manually controllable hydraulic lock means which is particularly adapted for controlling the positioning of the back rest in the passenger space at that end of the seat immediately adjacent the wall of the aircraft.
FIGURE 2b is a partial perspective view of one end of a seat cushion support strap.

Referring now to the drawings for the general arrangement of the invention, my improved seat generally comprises leg frames 20, a seat assembly 21, and back rest assemblies 22, the basic parts of which are best seen in FIGURE 2. As can be seen from an examination of FIGURE 1, the back rest assembly 22 is abbreviated in the vertical dimension in that it preferably terminates at its lower end short of the seat cushion of the seat assembly 21 although it may extend downwardly to the seat cushion. In the illustrated embodiment I have eliminated a substantial portion of abbreviated back rest 22 and the back rest is pivoted along an axis spaced above the seat cushion an appreciable distance. With this arrangement, the rear of the seat assembly 21 which defines the forward limits of the leg space available to the passenger behind that seat can be sloped forwardly quite sharply to radically increase the leg space of the passenger behind. It will also be observed in the first rank of seats, that by locating the pivotal axis of the abbreviated back rest 22 in this manner that when the back rest 22 assumes a reclined angle indicated in phantom outline, intrusion of the back rest 22 into the space of the passenger behind is greatly minimized. These advantages will at once become apparent by comparison to the pivot point P¹, indicated in the second rank of seats, which represents a conventional pivot axis location.

Each of the leg frames 20 is of a generally quadrangular configuration and preferably made of a square steel tubing. These frames comprise a vertical front leg 23, an inclined generally horizontal top rail 24, a vertically and forwardly inclined rear leg 25 and a bottom rail 26 rigidly interconnecting the lower ends of the front and rear legs. The front leg 23 and top rail 24 may be made of a single piece of such tubing and faired into the rear leg 25. The piece of tubing from which the rear leg 25 is made has an angular seat back portion 27 extending vertically and rearwardly above the top rail 24.

FIGURE 8 shows a conventional aircraft floor track 28 for mounting passenger seats. This track is an elongate extended member formed throughout its length with an upwardly opening slot 29 of generally dovetailed cross sectional configuration that at regularly spaced intervals therealong has entrances 30 in the slot edges. The legs 23 and 25 of frames 20 at their lower ends are each provided with a track stud 31 having a dovetail end adapted for sliding within the track slot 29 after insertion through an entrance 30. The dovetail engagement of studs 31 and tracks 28 in the intervals between entrances 30 prevents vertical displacement of leg frames 20 from the aircraft floor 32.

In order to restrain the seat 20 against sliding along the track 28 the bottom rail 26, at or adjacent its rear end, is provided with a spring loaded shear pin 33 adapted for insertion into entrances 30. The bottom rail 26 adjacent its rear end is formed with a downwardly opening spring pocket 35 adapted to slidably receive the enlarged head of the shear pin 33. A compression spring 36 is coiled around the reduced diameter stem 34 of the shear pin to normally bias the shear pin 33 outwardly of the pocket 35. The upper end of this stem 34 slidably protrudes through the top face of the bottom rail 26 and mounts a pin 37 that extends diametrically through the stem 34.

The spacing between the shear pin 33 and adjacent stud 31 is different than the spacing between adjacent track entrances 30. Thus when the shear pin 31 is aligned with an entrance 30 the stud 31 and track 28 are dovetailed. Spring 36 yieldably maintains the shear pin 33 in entrance 30 and since the shear pin head has a diameter greater than the width of slot 29 the seat is prevented from sliding along the track 28. In order to release the shear pin 33 for sliding a seat to a new position or to permit removal of a seat, a latch 38 is provided (FIGURE 9).

At one end of the latch 38 on the opposite sides thereof has a pair of confronting ears 39 each of which is formed with a hook 40 adapted to engage one end of the roll pin 37. Each of the ears 39 is formed with a cam edge 41 adapted to ride on the upper face of the bottom rail 26 of the leg frame 20. Thus when the latch 38 occupies a lowered position as shown in FIGURE 3, the enlarged head of the shear pin 33 is permitted to protrude downwardly beyond the lower face of the bottom rail 26 and into one of the entrances 30. When the free end of the latch 38 is raised, the cam edges 41 concurrently cause the pin 37 to be raised and shear pin 33 to be pulled out of the entrance 30. Thereafter the leg frame 20 can be slid along the track 28. When the dovetail heads of the studs 31 are aligned with entrances 30 the leg frames 20 and the seat can then be withdrawn from engagement with the track 28.

The pair of leg frames 20 are rigidly connected by a seat frame 42 best seen in FIGURE 2. The seat frame is made of tubular members and includes an elongated U-shaped front rail 43 having generally upwardly extending arms 44 at its opposite ends. A back rail 45 is also made of an elongated U-shaped piece of tubing having its opposite ends formed into forwardly and slightly upwardly extending arms 46. At both ends of the seat frame 42, the span between the confronting ends of the front rail arms 44 and back rail arms 45 is bridged by a section of reduced diameter tubing 47, the opposite ends of which are affixed to caps 48 which in turn are welded or otherwise secured to the end of the arm 44 or 46, as the case may be.

The passenger spaces are defined in the seat frame 42 by a plurality of divider tubes 49, in the present case four in number. Each of the dividers 49 is generally L-shaped in configuration and has the forward end of its horizontal leg rigidly affixed on top of the front rail 43 by welding or other suitable means. The upper end of the vertically extending leg of divider 49 is in each case affixed to the forward face of the back rail 45. All of the dividers 49 are braced by bottom rails 50 bridging pairs of the dividers 49 at their bends.

In order to contribute to the finished appearance of the chair, the seat frame 42 is partially enclosed along the back and at opposite ends by a pan 51. This pan is made of a sheet of metal or plastic material and along the back of the seat frame extends in a vertical dimension from the back rail 45 downwardly around the bottom rail 50 (see FIGURE 3). At the opposite ends of the seat frame the pan 51 wraps around the end dividers 49 to extend forwardly to the arms 44 of the front rail 43, and in a vertical direction extends downwardly from the section 47 and arm 46 of the back rail 45 to the divider 49.

The angle included between the legs of the dividers 49 is substantially equal to the angle included between the top rail 24 of the leg frames 20 and the seat back portion 27 of the rear leg 25 of the seat frames 20. As can be seen from FIGURE 3 the pan 51 is accordingly rested on the forward face of the seat back portions 27 of the leg frames 20 so that the pan 51 defines the forward limits of the passenger space behind the seat in the area between the pair of leg frames 20.

In order to secure the seat frame 42 to the pair of leg frames 20, the front leg 23 of each leg frame at its upper end has a filler piece 52 of sheet metal affixed thereto and provided with a tapped plug (not shown) on which the front rail 43 of the seat frame 42 is directly supported. Bores 53 are formed in the front rail 43 in alignment with the tapped plugs in the filler sections 52 and suitable bolts 54 then fasten the front rail 43 to the filler sections 52 of the leg frames 20.

The back rail 45 of seat frame 42 is fastened to the leg frames 20 in a similar manner. Referring to FIGURE 3 it will be noted that the back rail 45 rests directly upon the upper ends of the seat back portions 27 of the leg frames 20, these upper ends being concavely recessed for this purpose. A tapped plug (not shown) is provided in the upper end of each portion 27 and adapted to receive a bolt 54 inserted through a bore 55 formed in the back rail 45. After mounting of the seat frame 42 on the pair of leg frames 20 a channel-shaped molding 56 is fitted thereon to conceal the front rail 43, back rail 45 and tube sections 47 from view.

In order to support a seat cushion 58 in each passenger space, the seat frame 42 is adapted to have a plurality of webbing straps 57 connected thereto. As is shown in FIGURE 2b, each of the webbing straps 57 has a U-shaped hook member 59 connected to each of its ends. Referring to FIGURE 2, it will be observed that the dividers 49, the front rail 43 and back rail 50 of the seat frame 42 are formed with a plurality of spaced-apart pairs of perforations 60 in the upwardly facing side thereof adapted to receive the hook members 59. In each passenger space, a plurality of the webbing straps 57 are supported between the front rail 43 and bottom rail 50 while other webbing straps 57 are interwoven with the first-mentioned straps and supported between a pair of the dividers 49. The seat cushion 58 is thereafter placed on top of the webbing straps 57 to support a passenger.

Each back rest assembly 22 has a framework 61, such as is seen in FIGURE 2. This framework includes a pair of generally vertically extending opposite side members 62 interconnected at their lower ends by a brace 63, lying generally within the plane included by the side members 62 and spaced slightly above the lower ends of the side members 62. To define a headrest portion of the framework 61, the upper end portions of the side members 62 are slightly bent forwardly and inwardly towards one another. An intermediate brace 64 interconnects the opposite side members 62 at their bends and is disposed on the rear of the members 62. The upper ends of the pair of members 62 are rigidly interconnected by a broadly U-shaped top brace 65 extending rearwardly from the members 62. A semi-rigid sheet 66 of metal or other suitable material is affixed to the opposite side members 62 over the forwardly facing side of the framework 61 and extends from the upper edge of the side members down to and around the bottom brace 63.

The back rest framework 61 is finished by upholstering in a conventional manner, such as is indicated in FIGURE 3. A back rest cushion 67 covers the entire forward face of the framework 61 and may be held in place by a suitable finish molding 68, such as is indicated in FIGURE 1. This finish molding 68 may be made of Dural or a similar sheet material and may be integrally formed with a back cover portion 69 for the framework 61 which extends between the opposite side members 62. As is indicated in FIGURE 3, the back cover 69 in the area between the intermediate brace 64 and the bottom brace 63 may be recessed, as viewed from the rear. A sheet 70 of a light semi-rigid material can then be extended between the opposite sides of the seat immediately over the bottom brace 63 to define an upwardly opening pocket 71 in which newspapers, magazines, and like articles can be disposed.

In the three-passenger seat illustrated in the drawings, each of the back rest assemblies 22 is controlled by a different form of seat lock. Referring to FIGURE 2, the back rest for the nearest passenger space is controlled by a completely automatic lock. The middle passenger space is provided with a hydraulic lock having a manual control means mounted in a detachable arm rest of the seat. The far passenger space has its back rest position controlled by a hydraulic lock having manual control means mounted on a permanently attached arm of the seat. However, it will be understood that in actual practice it is desirable for the back rests in all seat spaces to be controlled by the same type of lock.

A pair of short brackets, each of which is indicated generally by the numeral 72, is provided in the nearest passenger space for supporting a back rest 22 thereon. Each of the brackets 72 is affixed to the back rail 45 of seat frame 42 on the forwardly facing side thereof, immediately adjacent a divider 49, and has a generally channel-shaped body portion 73 which opens forwardly and is parallel to the generally vertically extending leg of divider 49. The opposite side walls of bracket 72 extend upwardly and forwardly beyond the back rail 45 and at their extremities are formed with bores 74 defining the pivot axis P of the back rest 22.

Each of the side members 62 of back rest frame 61 at its lower end rigidly mounts a back rest hanger 75 whose configuration can best be seen in FIGURE 10. Each hanger 75 has an integrally formed boss 76 extending forwardly beyond the front face of the side member 62 and formed with a bore 77 of the same diameter as and adapted to register with the bores 74 in a bracket 72, thereafter to be held in place by a pivot pin or the like. A portion of the hanger 75 extends downwardly beyond the boss 76 and terminates in a cam head 78, which is receivable between the opposite side walls of a short bracket 72.

Referring now to FIGURE 11, the bottom end of each bracket 72 is closed by a base plate 79 affixed thereto which has a sleeve 80 welded or otherwise connected thereon within the confines of the bracket 72. A plunger 81 has a hollow stem axially slidably mounted within the sleeve 80 and is formed with an enlarged head 82 adapted for cooperative engagement with the cam head 78 of the back rest hanger 75. The plunger head 82 closes the upper end of the hollow stem to seat one end of a compression spring 83, whose other end is seated on the base plate 79.

The plunger head 82 is formed with an upwardly and forwardly sloping cam surface 84 over which the back rest hanger cam head 78 slides. In order to preserve the desired orientation of the cam surface 84 relative to the cam head 78, the plunger head 82 is square in cross-sectional configuration, (FIGURE 13) to avoid angular movement thereof within the channel-shaped bracket 72.

To limit forward movement of the back rest 22 to an erect position, the cam surface 84 of the plunger head 82 in its rear and lowermost end is provided with an upwardly extending detent 85, in the center of cam surface 84. This detent is adapted to be received within a rearwardly facing notch 86 centrally formed in the lower face of the cam head 78 of the back rest hanger 75. As is shown in the full line position of these parts in FIGURE 12, when detent 85 is seated in the notch 86, forward or counter-clockwise movement of the hanger 75 and therefore of the back rest 22 is limited to an erect position.

In aircraft seating it is desirable to have the back rest mounted in such a way that it can be folded forwardly beyond the erect position to a substantially horizontal position, as indicated in the third rank of seats in FIGURE 1. Such an arrangement not only facilitates installation of the seats, but is also desirable from the standpoint of safety. Thus, in the event of accident, if the back rest is yieldable to the impact of a passenger behind it, serious injuries to the passenger behind can be avoided, without at the same time causing serious injury to the passenger occupying the seat in front of the back rest.

To permit forward pivotal movement of the back rest for these purposes, the forward face 87 of the detent 85 serves as a cam substantially chordally disposed relative to the arc described by the angular movement of the lowermost edge 88 of the hanger notch 86. Thus, when a counterclockwise force is applied above the pivot axis P on the back rest assembly 22, the plunger head 82 and back rest hanger 75 will move to the dotted line positions of FIGURE 12, the edge 88 overriding the detent or forward face of detent 85 to cam the plunger 81 downwardly.

In order to limit clockwise or reclining movement of the back rest assembly 22, the bracket 72 at the upper end of its forwardly facing side has a stop plate 90 welded or otherwise secured thereto. As will be apparent from an examination of FIGURE 10, when the back rest assembly 22 is pivoted in a reclining or clockwise direction the plunger 81 is depressed to a level beneath the upper end of the stop plate 90. Accordingly, when the cam head 78 engages the stop plate 90, further clockwise movement of the back rest assembly 22 is prevented.

The springs 83 in the pair of brackets 72 are of such force as to comfortably and firmly support a passenger's weight on the back rest 22 in whatever attitude of recline the passenger wishes to assume. Assuming that a passenger is seated in the erect position, when he desires to recline, he merely forces the weight of his shoulders and head backwardly against the back rest 22. Since the passenger is applying this force at a substantial distance above the pivot axis P, the force of the springs 83 can be overcome without any great exertion on the part of the passenger. When the passenger has reached the desired reclining angle, he ceases the application of further force. The springs 83 will then exactly counterbalance the static weight of the passenger without compressing any further, nor exerting any countermoving force.

When the passenger releases his weight from the back rest 22, the springs 83 will automatically return the back rest to fully erect position. However, it is desirable that the back rest 22 not move in response to momentary shifting of the passenger's weight, nor return too quickly to the erect position. Accordingly, I have included within the lock just described a means for imparting a moment's hesitation to the return action of the spring 83 and for retarding the speed of return to erect position.

This gentle return action of springs 83 can be accomplished by providing an elastomeric O-ring 91 seated within an external circumferentially extending groove formed in the stem of each plunger 81. The contact of the O-ring 91 with the interior of sleeve 80 increases the static coefficient of friction of the assembly to a satisfactory degree whereby upon release of the passenger's weight on the back rest 22 there will be a momentary delay before the spring 83 overcomes the static coefficient of friction. The sliding coefficient of friction is also increased by this means and the back rest 22 thus gently returns to erect position.

I have also provided an adjustable means for increasing the static and sliding coefficients of friction, also usable to compensate for wear in the O-ring 91. While such adjustment means may take a variety of forms, I prefer that form best seen in FIGURE 11 which includes a rod 93 threadedly mounted at one end in the plunger head 82 and extending downwardly through an aligned bore in the bracket base plate 79. The outwardly projecting end of the rod 93 passes through a rubber or other elastomeric grommet 94. A nut 95 supports a washer 96 on the lower extremity of the rod 93 to limit upward movement of the plunger 81 in the short bracket 72 and to dampen the impact of arresting the back rest in erect position.

An L-shaped member 97 is mounted at the lower end of the short bracket 72 and is adjustable axially of the bracket. One arm of the member 97 projects under the base plate 79 and on its free end is formed with a suitable bore adapted to seat in a circumferential groove of the grommet 94. The other arm of the member 97 is held on the bracket 72 by an adjustment bolt 98 and a clamp bolt 99. The clamp bolt 99 passes through a vertically elongate slot 100 of the member 97 to permit adjusting movement of the member 97. The adjustment bolt 98 has an integrally formed cam section 101 which is rotatably received in a bore 102 of the member 97.

As is apparent, rotation of the adjustment bolt 98 causes concurrent movement of the member 97. With this arrangement, the compressive force exerted on the grommet 94 between the member 97 and the base plate 79 can be altered to affect a corresponding change in the frictional force compressively exerted by the grommet on the rod 93.

In the other two passenger spaces are provided a back rest control means utilizing one of the spring locks just described and a hydraulic lock 105. Each of these two passenger spaces at one side has a short bracket 72 for supporting the spring lock just described, while along the other side it has a long bracket 106. The long bracket 106 is substantially identical to the short bracket 72 and therefore will not be described in detail. Suffice it to say that the primary difference between the two brackets is in the matter of length.

As is shown in FIGURE 15, the hydraulic lock 105 in its upper end is provided with a plunger 107 having an overall configuration similar to the plunger head 82 of the spring lock. The upper face of the plunger 107 is inclined forwardly and upwardly for slidable camming engagement with the cam head 78 of one of the back rest hangers 75. However, in this instance the cam head 78 is formed without any notch 85 and has a pin 108 extending laterally beyond one side of the cam head 78 to be slidable in a confronting slot 109 formed in the plunger 107. When the hydraulic lock 105 is in unlocked condition, a quick return to erect position of the back rest assembly 22 can be accomplished by pulling forwardly on it, whereby the pin 108 engages the overhanging flange 110 of the slot 109 to draw the plunger 107 upwardly.

The long bracket 106 is closed at its lower end by a base plate 111 which is adapted to mount the hydraulic lock 105 within the confines of the bracket. The lock includes an elongate hollow stem 112 having a lower exteriorly threaded end extending through a suitable aperture of the base plate 111. A collar or flange 113 is integrally formed with the stem 112 and positioned on top of the base plate 111. A nut 114 threadedly engages the stem 112 and is run up against the base plate 111 to anchor the stem 112 in place by clamping the base plate 111 between the nut and flange 113.

A piston head 115 is integrally formed on the upper end of the stem 112 and axially slidably supports a surrounding fluid-sealed hydraulic cylinder 116. The hollow stem 112 extends slidably through the bottom end of the cylinder 116 and axially slidably receives an elongate needle valve 117 adapted at its upper end for operative association with a seat of an axial orifice 118 formed in the top of the piston head 115. A branch orifice 119 communicates with the seat of the central orifice 118 from the bottom of piston head 115, the two orifices combined serving to provide communication between opposite ends or sides of the piston head 115 only when valve 117 is open.

The hydraulic cylinder 116 and plunger 107 are united by a threaded connection 120 whereby the two parts move in unison. As will be apparent, when the needle valve is in open position, as illustrated, the hydraulic fluid 121 contained within the cylinder 116 can freely pass through the orifices 118 and 119 to opposite sides of the piston head 115 to permit adjustment of the back rest. When the seat is unoccupied, a compression spring 122 coiled around the stem 112 and seated between the base plate 111 and the lower end of the cylinder 116 will effect a return of the seat of the back rest to fully erect position.

The long bracket 106 is provided with a stop plate 123, much like the stop plate 90 of the bracket 72 and adapted to limit the extent to which the back rest can be moved in a reclining direction. Movement of the back rest in a counter-clockwise direction to fully erect position may be limited by the stroke of the cylinder 116. In order to permit complete disengagement of the cam head 78 and plunger 107, I have provided the arrangement illustrated in FIGURE 16 whereby the back rest 22 can be folded completely forwardly for purposes of installation and removal of the seat, for emergency forward deflection of the back rest 22 in response to the impact thereon of the weight of the passenger therebehind.

It will be noted that the pin 108 in the lower end of the cam head 78 is formed with a flat 124 which has in inclination substantially tangential to its arc of movement about the pivot axis P. A complementarily inclined surface 125 is formed at the rear end of the overhanging flange 110 on the upper end of the plunger 107. As is illsutrated in FIGURE 16, when the plunger 107 reaches the extreme upper limit of its stroke, the surface 125 is also disposed substantially tangentially to the pivot axis P so that upon counterclockwise movement of the back rest 22 beyond the fully erect position, the pin 108 can slide past the surface 125.

This can be accomplished even though the back rest is reclined and the manual control for the needle valve 117 has not been actuated by providing a check valve 126 within an orifice 127 through the piston head 115. This check valve is adapted to pass the hydraulic fluid 121 from the lower side of the piston head to the upper side, thus permitting upward movement of the cylinder 116 and corresponding movement of the plunger 107 and overriding of the hydraulic locks. The spring associated with the check valve 126 must be strong enough to keep the check valve normally closed in the orifice 127 against the force of the spring 122.

In order to accomplish axial movement of the needle valve 117 for opening and closing thereof, the needle valve carries a radially outwardly extending pin 128 which rides in a cam slot 129 formed in the confronting portion of the stem 112. The arrangement illustrated in FIGURE 15 is such that when the needle valve 117 is rotated in a clockwise direction, as viewed from the lower end of the lock 105, it is moved out of the closed position. In order to return the needle valve 117 to a normally closed position it is interconnected by a torsion spring 130 with the lower end of the stem 112, the spring being adapted to rotate the needle valve 117 in a counter-clockwise direction.

The hydraulic lock 105 which is located on the right hand side of the center passenger space in the bracket 106 is controlled by manual actuating means, part of which is mounted in a detachable arm rest 131, such as is seen in FIGURE 4. Referring to FIGURE 3, the arm rest 131 includes an inverted L-shaped frame member 132 whose downwardly pointing arm is provided at its lower end with a locating pin 133 receivable in an aligned sleeve 134 mounted in the forward end of the divider 49. The horizontally rearwardly extending arm of the frame member 132 terminates in a pin 135 which is formed with a circumferentially extending groove 136. In order to receive the pin 135, a keyhole slot 137 is formed at the upper end of the divider 49 on the forwardly facing side thereof. As will be apparent, the arm rest 131 is mounted on the seat frame 42 by inserting the pin 135 into the upper end of the keyhole slot 137 and thereafter pushing downwardly on the arm rest to engage the pin 133 in the sleeve 134, and the groove 136 of the pin 135 within the narrow portion of the keyhole slot 137.

Within the arm rest 131, an upwardly extending lever 138 is pivotally mounted on top of the member 132. This lever is normally biased to a forward position by a spring 139 whose other end is affixed to a framing member 140 of the arm rest 131. A pushbutton 141 is horizontally slidably mounted within the arm rest 131 and has its forward end exposed to be accessible for actuation by the passenger occupying the center seat. A pushrod 142 is connected at its forward end to the lever 138 and extends rearwardly therefrom through the arm rest 131, to protrude rearwardly therefrom.

When the arm rest 131 is attached to the seat, the rearwardly protruding end of the pushrod 142 is positioned immediately above the upper end of the divider tube 49. This end of divider 49 is closed by a bushing 143 which journals a torque rod 144 extending downwardly through the generally vertically extending leg of the divider 49. Another bushing 145 (FIGURE 7) is journalled in the bend of the divider 49 and keyed to the rod 144 for angular movement therewith.

The rod 144 extends upwardly beyond the bushing 143 and is drivingly engaged by a substantially semicircular member 146. As is shown in FIGURE 6, the rearwardly protruding end of the pushrod 142 drivingly engages a flat front face 147 of the member 146 at a point offset from the axis of the rod 144, so that upon actuation of the pushbutton 141, the member 146 is turned in a clockwise direction to the position indicated in phantom line. Such movement causes a corresponding angular movement of the bushing 145 and an arm 148 thereof that is drivingly engaged with an arm 149 drivingly connected to the lower end of the needle valve 117. The needle valve is thus rotated in a clockwise direction to move to an open position whereby adjustment of the back rest 22 can be accomplished by the passenger.

A generally similar manual control means is provided in the permanently attached arm rest of the seat adjacent the wall of the aircraft and is shown in detail in FIGURE 2a. In this arrangement the hydraulic lock 105 associated therewith is controlled by the passenger through a pushbutton 150 mounted in the fixed arm rest and drivingly connected at its rear end to one end of a bell crank 151. A tension spring 152 is connected to the other end of the pivotally mounted bell crank 151 and normally biases the pushbutton 150 to a forward position, in which it protrudes out of the arm rest. The bell crank 151, in turn, is drivingly connected to a rod 153 whose other end is drivingly connected to a crank arm 154 pivotally mounted on an adjacent portion of the divider 49, on a shaft 155. The other end of the shaft 155 protrudes through the inside of the divider 49 and mounts a dog 156 which in turn is drivingly engageable with an arm 157 extending radially outwardly from the lower end of the needle valve 117. As will be apparent from an examination of this linkage, when the pushbutton 150 is depressed by the passenger, clockwise angular movement of the needle valve 117 is effected to permit opening thereof and adjusting movement of the back rest 22.

Just as the seat frame 42 is covered on the outside by the provision of the pan member 51, giving a finished appearance to the seat, so too, the tubular members of the seat frame 42 are covered and the seat given a finished appearance on the inside by tailoring a piece of suitable material to lie across the front faces of the vertically extending portions of the dividers 49 and extending between opposite ends of the seat and affixed also on the inside of the fixed arm rests at the opposite ends of the seat. The forwardly projecting parts of the pivot brackets 72 and 74, as well as the bosses 76 on the backrest hangers 75 may be hidden from view beneath the upholstering of the backrest assembly 22.

It will be noted that the pivot brackets 72 and 106 are included within the plane included by the vertically extending parts of the divider tubes 49, and the hydraulic and spring lock mechanisms are fully enclosed within these brackets. This arrangement provides a radical saving in the longitudinally horizontal dimension and permits utilization of the saved space as knee and leg space for a seated passenger, as can be determined from an examination of FIGURE 1. Visualizing the three-passenger seat as viewed from the rear, it will be apparent that, from one end of the seat to the other, the forward limit of space available to the passenger seated behind is defined by the pan 51, this clear space being interrupted only by the generally vertically extending seat back part 27 of the leg frames 20. Since the leg frames 20 are preferably positioned almost directly beneath divider tubes 49, their presence does not substantially interfere with passenger leg space.

As will be apparent from an examination of FIGURE 1, a number of advantages are derived from locating the pivot axis P in a position offset from the intersection of the plane of the backrest frame 62 and the seat frame 42. As is indicated in the second rank of seats of FIGURE 1, it is conventional to locate the pivotal axis of reclining seats in approximately the position P', which is generally located at the intersection of the planes of the seat and backrest. By providing an abbreviated backrest 22 pivoted about the offset axis P, a great saving in space is accomplished since the angular area included by pivotal movement of the backrest 22, through its full range, is far less than the angular area included by comparable pivotal movement of a conventional backrest hinged about the axis P'.

The dotted outline 160 in FIGURE 1 indicates an angle of recline of a conventional backrest equal to the angle of recline of my backrest 22 in the second rank of seats. It will be seen that with my invention all of that space indicated between the dotted outline 160 and the back surface of the backrest 22 has been saved for use by a passenger in the third rank of seats. The dotted outline 161 illustrates an angle of recline assumed by a conventional backrest pivoted about the axis P' which is less than the angle of recline of my backrest 22, even though both backrests penetrate rearwardly to substantially the same extent. From this comparison it is evident that with my improved seat, a greater angle of recline is possible within the same amount of space and a saving of space is at the same time accomplished as indicated by the space between the dotted outline 161 and the back surface of the backrest 22.

It will be apparent to those skilled in the art that my backrest seat controls may also be utilized for support of a backrest which is pivoted about a conventional axis such as P'. It will also be apparent that, although many advantages arise from the use of an abbreviated backrest, the pivot axis P may be lowered substantially and is not necessarily confined to the lumbar area of a person in the seat. Other variations of my invention will also occur to those skilled in the art, as for example locating the pivot axis P rearwardly, or above, or below, rather than forwardly of the linear axis of the backrest recline control means.

Accordingly, it is to be understood that although the forms of the invention herein shown and described are fully capable of achieving the objects and providing the advantages hereinbefore mentioned, they are merely illustrative of presently preferred embodiments and I do not mean to limit myself to the details of construction herein shown and described, other than as defined in the appended claims.

I claim:

1. A seat comprising: a seat frame; a backrest frame connected to an upwardly extending rearward portion of said seat frame for pivotal movement about a horizontal axis spaced forwardly from the intersection of the planes of said seat frame and backrest frame; an axially slidable plunger mounted on and generally within the plane of said seat frame and slidingly engageable at one end with the lower end of said backrest frame and depressable into said seat frame in response to rearward angular movement of said backrest frame; and a means on said seat frame for releasably arresting depression of said plunger and consequent rearward movement of said backrest frame, said means being calculated to prevent such rearward movement at least whenever the weight of a seated passenger is statically supported, in part, against said backrest frame.

2. A seat as set forth in claim 1 in which said means for releasably arresting rearward movement of said backrest frame comprises a spring means operatively associated with said plunger to bias said plunger against said backrest frame and having a force calculated to move said backrest frame forwardly when said seat is unoccupied, and having a force calculated to permit rearward movement of said backrest frame whenever a passenger seated on said seat frame dynamically impresses himself backwardly against said backrest frame, and further having a force calculated to prevent rearward movement of said backrest frame whenever said seated passenger statically rests his weight on said backrest frame.

3. A seat as defined in claim 2 in which said plunger, said spring means and a mounting means therefor have a static coefficient of friction calculated to prevent said spring means from forcing said backrest frame forwardly immediately upon removal of a passenger's weight from against said backrest frame and further have a sliding coefficient of friction calculated to retard the speed of forward movement of said backrest frame after said static coefficient of friction has been overcome by said spring means in order to prevent abrupt forward movement of said backrest frame when a passenger has removed his weight therefrom.

4. A seat as set forth in claim 1 in which said means for releasably arresting rearward movement of said backrest frame comprises a fluid-sealed cylinder drivingly connected to said plunger, a stationary piston in and slidably supporting said cylinder for axial reciprocation and a manually controllable valve means in said piston for controlling flow of a hydraulic fluid between opposite faces of said piston that can be selectively opened and closed to respectively permit and prevent angular movement of said backrest frame.

5. A seat comprising: a seat frame including a pair of opposite side members terminating in generally upwardly extending rear end portions of a height at least as great as the thickness of a seat cushion disposed on said seat frame; an abbreviated backrest frame extending upwardly from said seat frame; a pair of brackets on opposite sides of said seat frame for pivotally mounting said backrest frame for angular movement about a horizontal axis spaced forwardly of the intersection of said frames and spaced above said seat cushion, the bodies of said brackets lying within a plane including said upwardly extending rear end portions of said side members; a plunger housed in each of said brackets and mounted for vertically slidable reciprocation, each of said plungers being formed with a cam face on its upper end slidingly engageable with a cam head rigidly affixed to the lower end of said backrest frame adapted to translate angular movement of said backrest frame into axial movement of said plungers; and a spring enclosed in each of said brackets under said plungers to bias said plungers against said cam heads, said springs having a force calculated to move said backrest frame forwardly when said seat is unoccupied, and having a force calculated to permit rearward movement of said backrest frame whenever a passenger seated on said seat frame dynamically impresses himself backwardly against said backrest frame, and further having a force calculated to prevent rearward movement of said backrest frame whenever said seated passenger statically rests his weight on said backrest frame.

6. A seat comprising: a seat frame including a pair of opposite side members terminating in generally upwardly extending rear end portions of a height at least as great as the thickness of a seat cushion disposed on said seat frame; an abbreviated backrest frame extending upwardly from said seat frame; a pair of brackets on opposite sides of said seat frame for pivotally mounting said backrest frame for angular movement about a horizontal axis spaced forwardly of the intersection of said frames and spaced above said seat cushion, the bodies of said brackets lying within a plane including said upwardly extending rear end portions of said side members; a coaxial sleeve rigidly mounted in each of said brackets and having a closed bottom end; a hollow stemmed plunger coaxially telescopically mounted in each of said sleeves formed with a downwardly opening axial bore and having an upwardly and forwardly sloping cam face on its upper end; a pair of rigidly mounted cam heads protruding downwardly from the lower end of said backrest frame to slidably engage said plungers and adapted to depress said plungers upon rearward movement of said backrest frame; and a spring in said bore of each of said plungers and bearing against said closed bottom end of said sleeve to bias said plungers against said cam heads, said springs having a force calculated to move said backrest frame forwardly when said seat is unoccupied, and having a force calculated to permit rearward movement of said backrest frame whenever a passenger seated on said seat frame dynamically impresses himself backwardly against said backrest frame, and further having a force calculated to prevent rearward movement of said backrest frame whenever said seated passenger statically rests his weight on said backrest frame.

7. A seat as set forth in claim 6 in which the stem of each of said plungers is formed with a circumferentially extending groove and an elastomeric O-ring is seated in said groove in frictional engagement with said sleeve, said engagement being calculated to increase the static and sliding coefficients of friction of said plunger in said sleeve to reduce the speed with which said springs move said backrest frame from a reclining angle to an erect position.

8. A seat as set forth in claim 6 in which an elongate rod is coaxially affixed to said plunger and slidably extends through said closed bottom end of said sleeve, and said bracket exteriorly mounts a means engaging said rod immediately beneath said closed bottom end of said sleeve and is adjustable to vary the force of said engagement whereby the static and sliding coefficients of friction of said rod and adjustable means reduce the speed with which said springs move said backrest frame from a reclining angle to an erect position.

9. A seat as set forth in claim 6 in which each of said brackets includes a stop plate affixed to the forwardly facing side thereof beneath whose upper edge said plunger is depressed when said brackrest frame is moved rearwardly and adapted to be engaged by one of said cam heads to limit rearward movement of said backrest frame, said cam face of said plunger at its rear end having an upwardly projecting detent engageable with a rearwardly facing notch formed in said cam head and adapted to limit forward movement of said backrest frame to an erect position, and the abutting faces of said detent and said notch being adapted for cam engagement to depress said plunger whenever said backrest frame is moved forwardly beyond said erect position whereby said cam head overrides and is released from said detent.

10. A seat comprising: a seat frame including a pair of opposite side members terminating in generally upwardly extending rear end portions of a height at least as great as the thickness of a seat cushion disposed on said seat frame; an abbreviated backrest frame extending upwardly from said seat frame; a pair of brackets on opposite sides of said seat frame for pivotally mounting said backrest frame for angular movement about a horizontal axis spaced forwardly of the intersection of said frames and spaced above said seat cushion, the bodies of said brackets lying within a plane including said upwardly extending rear end portions of said side members; a plunger housed in each of said brackets and mounted for vertically slidable reciprocation, each of said plungers being formed with a cam face on its upper end slidingly engageable with a cam head rigidly affixed to the lower of said backrest frame adapted to translate angular movement of said backrest frame into axial movement of said plungers; and a hydraulic lock means enclosed in at least one of said brackets under said plungers, said lock means comprising a fluid-sealed cylinder drivingly connected to said plunger, a stationary piston in and slidably supporting said cylinder for axial reciprocation and a manually controllable valve means in said piston for controlling flow of a hydraulic fluid between opposite faces of said piston that can be selectively opened and closed to respectively permit and prevent angular movement of said backrest frame.

11. A seat as set forth in claim 10 in which a spring is enclosed in said bracket under said cylinder to bias said cylinder upwardly and an orifice is formed through said piston between the opposite faces thereof that is closed by a check valve to normally prevent the passage of hydraulic fluid from the lower end of said cylinder to the upper end of said cylinder against the pressure of said spring, said check valve being adapted to open in response to the application of a force to said brackrest frame in a direction to move said backrest frame forwardly whereby said backrest can yield forwardly in response to said force while said manually controllable valve means is in closed position.

12. A seat as set forth in claim 10 in which said manually controllable valve means comprises a generally axially directed orifice formed through said piston having a valve seat adapted to be closed by the upper end of an elongate needle valve member, said piston having an integral stem extending downwardly therefrom to slidably project through the bottom end wall of said cylinder and axially slidably receiving said valve member, said stem and valve member having cooperating means to translate angular movement of said member into axial valve opening and closing movement of said member, and said bracket mounting torsion spring means normally biasing said member into closed position on said seat, and a mechanical means mounted in an armrest of said seat and drivingly connected to said valve member to turn said member against said torque spring means and to open said valve seat.

13. A seat comprising: a seat frame; a backrest frame connected to the rear of said seat frame for pivotal movement about a horizontal axis; an axially slidable plunger mounted on said seat frame and slidingly engageable at one end with said backrest frame and depressable in response to rearward angular movement of said backrest frame; and a means on said seat frame for releasably arresting depression of said plunger and consequent rearward movement of said backrest frame comprising a spring means operatively associated with said plunger to bias said plunger against said backrest frame and having a force calculated to move said backrest frame forwardly when said seat is unoccupied, and having a force calculated to permit rearward movement of said backrest frame whenever a passenger seated on said seat frame dynamically impresses himself backwardly against said backrest frame, and further having a force calculated to prevent rearward movement of said backrest frame whenever said seated passenger statically rests his weight on said backrest frame.

14. A seat comprising: a seat frame; a backrest frame extending upwardly from said seat frame; a means pivotally interconnecting said seat frame and said backrest frame for angular movement of said backrest frame about a horizontal axis; cam means interposed between the lower end of said backrest frame and said seat frame including an axially slidable plunger mounted on said seat frame and engageable by said backrest frame to be depressed in response to rearward angular movement of said backrest frame; and a means on said seat frame for releasably arresting depression of said plunger and consequent rearward movement of said backrest frame comprising a spring means operatively associated with said plunger to bias said plunger against said backrest frame and having a force calculated to move said backrest frame forwardly when said seat is unoccupied, and having a force calculated to permit rearward movement of said backrest frame whenever a passenger seated on said seat frame dynamically impresses himself backwardly against said backrest frame, and further having a force calculated to prevent rearward movement of said backrest frame whenever said seated passenger statically rests his weight on said backrest frame.

15. A seat comprising: a seat frame; a backrest frame connected to the rear of said seat frame for pivotal movement about a horizontal axis spaced forwardly from the intersection of the planes of said seat frame and backrest frame; an axially slidable plunger mounted on and generally within the plane of said seat frame and slidingly engageable at one end with the lower end of said backrest frame and depressable into said seat frame in response to rearward angular movement of said backrest frame; and means on said seat frame for releasably arresting depression of said plunger and consequent rearward movement of said backrest frame comprising a compression spring operatively interposed between said plunger and said seat frame to bias said plunger against said backrest frame, said compression spring having a force calculated to move said backrest frame forwardly when said seat is unoccupied, and having a force calculated to permit rearward movement of said backrest frame whenever a passenger seated on said seat frame dynamically impresses himself backwardly against said backrest frame, and further having a force calculated to prevent rearward movement of said backrest frame whenever said seated passenger statically rests his weight on said backrest frame.

References Cited in the file of this patent
UNITED STATES PATENTS

| | | |
|---|---|---|
| 1,654,726 | Graham | Jan. 3, 1928 |
| 1,926,259 | Bitzenburger | Sept. 12, 1933 |
| 2,508,769 | Osbon | May 23, 1950 |
| 2,674,300 | Liljengren | Apr. 6, 1954 |
| 2,842,187 | Hendrickson | July 8, 1958 |

UNITED STATES PATENT OFFICE
CERTIFICATE OF CORRECTION

Patent No. 3,037,812                          June 5, 1962

Benjamin F. Monroe

It is hereby certified that error appears in the above numbered patent requiring correction and that the said Letters Patent should read as corrected below.

Column 14, line 21, after "lower" insert -- end --.

Signed and sealed this 25th day of September 1962.

(SEAL)
Attest:

ERNEST W. SWIDER
Attesting Officer

DAVID L. LADD
Commissioner of Patents